US012424096B2

(12) United States Patent
Sugano

(10) Patent No.: US 12,424,096 B2
(45) Date of Patent: Sep. 23, 2025

(54) PARKING SUPPORT METHOD, NON-TRANSITORY COMPUTER-READABLE STORAGE MEDIUM, AND PARKING SUPPORT SYSTEM

(71) Applicant: TOYOTA JIDOSHA KABUSHIKI KAISHA, Toyota (JP)

(72) Inventor: Tatsuya Sugano, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 18/201,318

(22) Filed: May 24, 2023

(65) Prior Publication Data

US 2023/0419835 A1   Dec. 28, 2023

(30) Foreign Application Priority Data

Jun. 27, 2022 (JP) ................................. 2022-102835

(51) Int. Cl.
*G08G 1/14* (2006.01)
*B60W 60/00* (2020.01)
*G08G 1/16* (2006.01)

(52) U.S. Cl.
CPC ......... *G08G 1/146* (2013.01); *B60W 60/0025* (2020.02); *B60W 2556/45* (2020.02); *G08G 1/168* (2013.01)

(58) Field of Classification Search
CPC ... G08G 1/146; G08G 1/168; B60W 60/0025; B60W 2556/45
See application file for complete search history.

(56) References Cited

U.S. PATENT DOCUMENTS 10,414,438 B2 *  9/2019 Mikuriya ............. B62D 15/024
10,737,689 B2 *  8/2020 Kim ....................... B60W 30/06
11,254,218 B2 *  2/2022 Haneda ................... B60L 53/65
(Continued)

FOREIGN PATENT DOCUMENTS

JP       2019-182154 A      10/2019
JP       2021043551 A    *   3/2021    ............... G08G 1/14
(Continued)

OTHER PUBLICATIONS

Translation of JP-2021043551-A, 13 pages (Year: 2021).*
Translation of WO-2017067786-A1, 13 pages (Year: 2017).*

*Primary Examiner* — Dale W Hilgendorf
(74) *Attorney, Agent, or Firm* — Dinsmore & Shohl LLP

(57) ABSTRACT

The present disclosure provides a parking support method for supporting parking of a vehicle in a parking place, the vehicle capable of autonomous driving at least in the parking place. The parking support method comprises the following three steps. The first step is a step of setting an exclusive area in which other vehicles are prohibited from traveling in order to secure an area in which the vehicle entering the parking place travels, the exclusive area being determined uniformly according to a position of a parking frame. The second step is a step of at least when the vehicle begins a parking motion to park the vehicle in the parking frame, acquiring a parking motion area required for the parking motion and generated by the vehicle The third step is a step of changing the exclusive area so as to secure at least the parking motion area.

5 Claims, 5 Drawing Sheets

(56) References Cited

U.S. PATENT DOCUMENTS

| | | | |
|---|---|---|---|
| 11,355,011 B1* | 6/2022 | Khmelev | G08G 1/0129 |
| 11,749,116 B1* | 9/2023 | Young | B60K 35/28 |
| | | | 340/932.2 |
| 2004/0249564 A1* | 12/2004 | Iwakiri | B62D 15/027 |
| | | | 340/932.2 |
| 2017/0008515 A1* | 1/2017 | Seo | B60W 10/04 |
| 2018/0292832 A1* | 10/2018 | Bae | B60W 30/06 |
| 2018/0308358 A1* | 10/2018 | Hayakawa | G01C 21/26 |
| 2018/0308359 A1* | 10/2018 | Hayakawa | G08G 1/145 |
| 2020/0207336 A1* | 7/2020 | Oh | B60W 50/14 |
| 2020/0384985 A1* | 12/2020 | Noguchi | G08G 1/147 |
| 2021/0354688 A1* | 11/2021 | Tashiro | G06V 20/58 |
| 2022/0144250 A1 | 5/2022 | Hidaka | |
| 2022/0212657 A1* | 7/2022 | Sugano | G08G 1/146 |
| 2023/0136133 A1* | 5/2023 | Hidaka | G01C 21/3685 |
| | | | 701/26 |
| 2023/0242098 A1* | 8/2023 | Chen | B60W 30/06 |
| | | | 701/24 |
| 2024/0140402 A1* | 5/2024 | Murai | B62D 15/0285 |
| 2024/0208488 A1* | 6/2024 | Kobayashi | G08G 1/146 |
| 2024/0242609 A1* | 7/2024 | Fukumoto | G08G 1/143 |
| 2025/0018931 A1* | 1/2025 | Doshi | B62D 15/0285 |

FOREIGN PATENT DOCUMENTS

| | | | | |
|---|---|---|---|---|
| WO | WO-2017067786 A1 * | 4/2017 | | B60W 30/09 |
| WO | 2021/020092 A1 | 2/2021 | | |

* cited by examiner

PARKING SUPPORT METHOD, NON-TRANSITORY COMPUTER-READABLE STORAGE MEDIUM, AND PARKING SUPPORT SYSTEM

CROSS-REFERENCE TO RELATED APPLICATION

The present application claims priority under 35 U.S.C. § 119 to Japanese Patent Application No. 2022-102835, filed Jun. 27, 2022, the contents of which application are incorporated herein by reference in their entirety.

BACKGROUND

Field

The present disclosure relates to a parking support method, a non-transitory computer-readable storage medium, and a parking support system for supporting parking of a vehicle in a parking place.

Background Art

WO2021-020092A discloses a technique for assisting parking of a self-driving vehicle in a parking lot by a parking assist apparatus. The parking assist apparatus generates a guidance route for each of multiple self-driving vehicles existing in the parking lot such that the guidance routes of the self-driving vehicles do not overlap with one another.

In addition to WO2021-020092A, JP2019-182154A can be exemplified as a document showing the technical level in the technical field of the present disclosure at the time of filing.

SUMMARY

A technique for supporting parking of an autonomous driving vehicle in a parking place is known. In such a technique, a travel route to a parking frame assigned to a vehicle entering the parking place is automatically determined by a management server or the like and is transmitted to the vehicle. The vehicle can park itself in the parking frame by traveling in the parking place along the received travel route by autonomous driving. Further, in such a technique, an area for traveling of the vehicle entering the parking place is secured by the management server in order to enhance safety in the parking place. The secured area is determined so as to include an area required for the traveling of the vehicle 10 allowing for a margin in consideration of variation. Then, other vehicles are prohibited from traveling in the secured area until the vehicle finishes parking. By traveling in the secured area, the vehicle can park itself in the parking frame in safety without touching other vehicles.

Until the vehicle gets close to the assigned parking frame, the variation in the area required for the traveling of the vehicle is small because the vehicle moves forward along the travel route. However, when the vehicle gets close to the parking frame, the vehicle performs a motion such as swinging its head or going back and forth to park itself in the parking frame. Since such motion to park the vehicle varies depending on performance of the vehicle, size of the vehicle, surrounding environment like a parking situation of other vehicles, and the like, the area required for the traveling of the vehicle also varies around the parking frame where the vehicle is parked. If the area which the management server secures for traveling of the vehicle is smaller than the area which the vehicle actually needs to travel, there is a possibility that another vehicle passes the area which the vehicle needs to travel, and safety in the parking place is not ensured. On the other hand, if the area which the management server secures for traveling of the vehicle is larger than the area which the vehicle actually needs to travel, even another vehicle which can actually travel is prohibited from traveling and cannot begin traveling until the vehicle finishes parking. It means that unnecessary waiting time occurs.

The present disclosure is provided in view of the above-described problems. An object of the present disclosure is to appropriately set an area which is secured for traveling of a vehicle entering a parking place and to make parking more efficient in the parking place.

The present disclosure provides a parking support method for supporting parking of a vehicle in a parking place, the vehicle capable of autonomous driving at least in the parking place. The parking support method comprises steps of:
  setting an exclusive area in which other vehicles are prohibited from traveling in order to secure an area in which the vehicle entering the parking place travels, the exclusive area being determined uniformly according to a position of a parking frame;
  at least when the vehicle begins a parking motion to park the vehicle in the parking frame, acquiring a parking motion area required for the parking motion and generated by the vehicle; and
  changing the exclusive area so as to secure at least the parking motion area.

The present disclosure provides a non-transitory computer-readable storage medium storing a program for supporting parking of a vehicle in a parking place, the vehicle capable of autonomous driving at least in the parking place. The program is configured to cause the computer to execute:
  setting an exclusive area in which other vehicles are prohibited from traveling in order to secure an area in which the vehicle entering the parking place travels, the exclusive area being determined uniformly according to a position of a parking frame;
  at least when the vehicle begins a parking motion to park the vehicle in the parking frame, acquiring a parking motion area required for the parking motion and generated by the vehicle; and
  changing the exclusive area so as to secure at least the parking motion area.

The present disclosure provides a parking support system for supporting parking of a vehicle in a parking place, the vehicle capable of autonomous driving at least in the parking place. The parking support system comprises:
  one or more computers; and
  one or more memory devices storing one or more programs that when executed by the one or more computers, cause the one or more computers to execute:
  setting an exclusive area in which other vehicles are prohibited from traveling in order to secure an area in which the vehicle entering the parking place travels, the exclusive area being determined uniformly according to a position of a parking frame;
  at least when the vehicle begins a parking motion to park the vehicle in the parking frame, acquiring a parking motion area required for the parking motion and generated by the vehicle; and
  changing the exclusive area so as to secure at least the parking motion area.

According to the technique of the present disclosure, about a technique for supporting parking of a vehicle capable of autonomous driving, it is possible to appropriately set an area which is secured for traveling of a vehicle entering in a parking place and to make parking efficient.

DETAILED DESCRIPTION

Embodiments of the present disclosure will be described with reference to the accompanying drawings.

1. Overview

Figure 1:
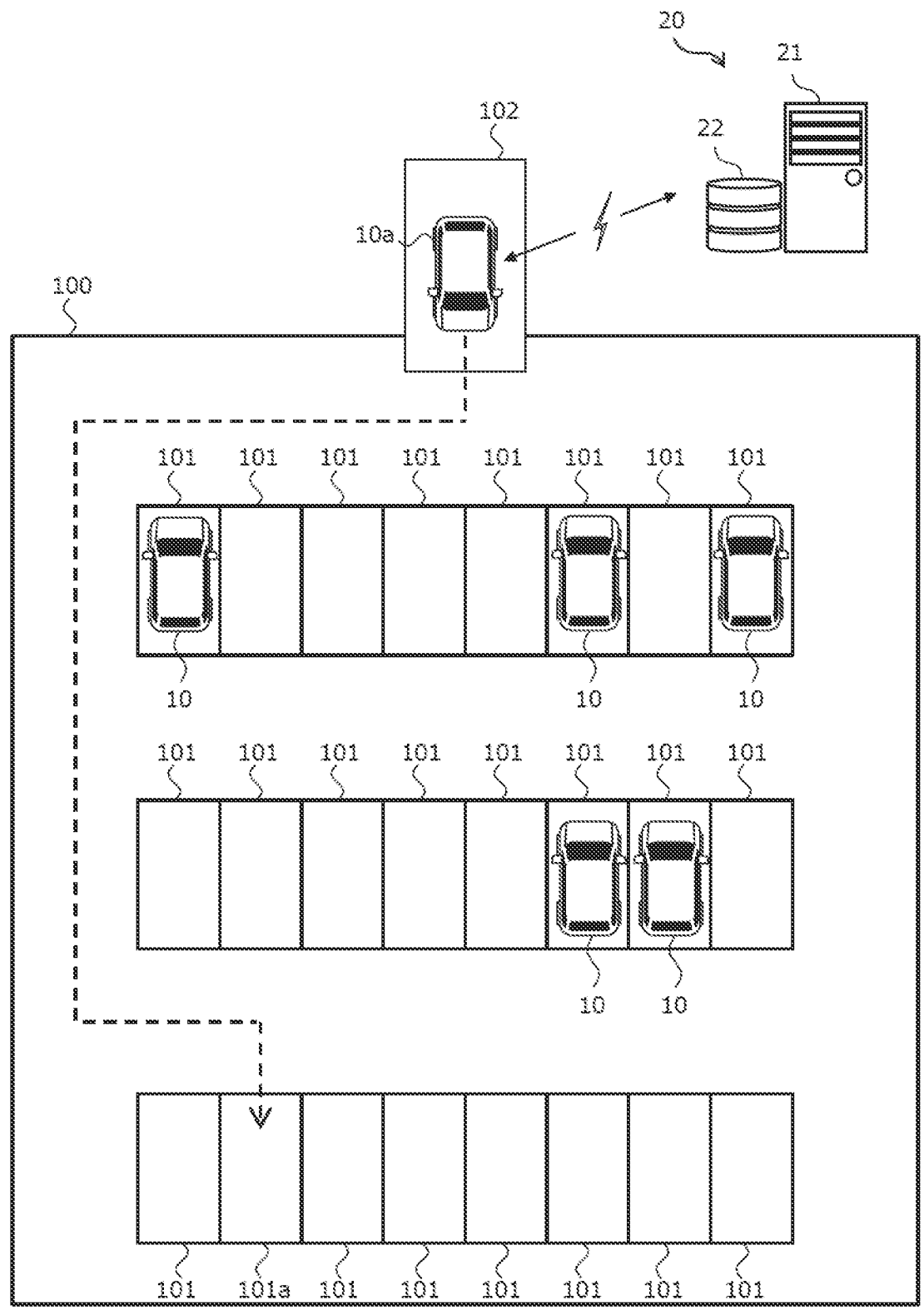
FIG. 1 is a schematic diagram of a parking place according to embodiments of the present disclosure.

A parking support method according to the present disclosure is a method for supporting parking of a vehicle in a parking place. The parking support method according to the present disclosure is mainly performed by a parking support system for supporting parking of the vehicle in the parking place. FIG. 1 is a schematic diagram of a parking place 100 to which a parking support system 20 for supporting parking of vehicles 10 is applied. The parking support system 20 may be a system included in a management server which manages the parking place 100. The parking place 100 is a parking place including a plurality of parking frames 101 in each of which the vehicle 10 can be parked. The vehicles 10 are vehicles configured to be able to automatically travel at least in the parking place 100. For example, the vehicle 10 may be an autonomous driving vehicle or an automated valet parking (AVP) vehicle, which can use automated valet parking.

Autonomous driving of the vehicles 10 in the parking place 100 is controlled by vehicle control systems respectively mounted on the vehicles 10. The vehicle control systems are wirelessly connected to the parking support system 20. The parking support system 20 includes a control device 21 and a memory device 22. The memory device 22 may be plural. The control device 21 includes one or more computers connected to the vehicle control systems via a wireless network and executes various processes necessary for supporting parking of the vehicles 10 in the parking place 100. The memory device 22 includes one or more storage devices built in or externally attached to the control device 21, or one or more data servers connected to the control device 21 via a network. The memory device 22 stores various programs executable by the control device 21 and various data necessary for execution of the various programs.

Parking of the vehicles 10 are performed in the following flow, for example. Accepting a parking request of the vehicle 10 transmitted from a user of the vehicle 10 or the like, the parking support system 20 assigns a parking frame which is referred to as a target parking frame to the vehicle 10 in consideration of the availability of the parking place 100 or the like. The parking support system 20 generates a travel route of the vehicle 10 based on the position of the target parking frame. The generated travel route is transmitted to the vehicle control system, and the vehicle 10 automatically travels along the travel route and automatically parks itself in the target parking frame by control of the vehicle control system. For example, FIG. 1 shows a vehicle 10a stopping in a getting in/out place 102 to enter the parking place 100. The vehicle 10a automatically travels in the parking place 100 from the getting in/out place 102 along a travel route, which is indicated by a dotted line, and automatically parks itself in a parking frame 101a, which is a target parking frame of the vehicle 10a.

The support of parking of the vehicle 10 by the parking support system 20 includes assignment of the target parking frame and generation of the travel route as mentioned above. The parking support system 20 can generate the travel route of the vehicle 10 uniformly in accordance with the position of the target parking frame as a route linking the getting in/out place 102 and the target parking frame.

The support of parking of the vehicle 10 by the parking support system 20 also includes securing an area for traveling of the vehicle 10 which enters the parking place 100. In the secured area, other vehicles are prohibited from traveling until the vehicle 10 finishes parking. By traveling in the secured area, the vehicle 10 can safely travel in the parking place 100 and park itself without being obstructed by other vehicles.

Hereinafter, in the present description, the area secured by the parking support system 20 for the vehicle 10 to travel is referred to as an exclusive area. The exclusive area is an area uniformly determined in accordance with the position of the target parking frame. The exclusive area is generally determined so as to include an area required for the traveling of the vehicle 10 allowing for a margin in consideration of variation of each vehicle 10 or each situation when a vehicle 10 is parked.

Figure 2:
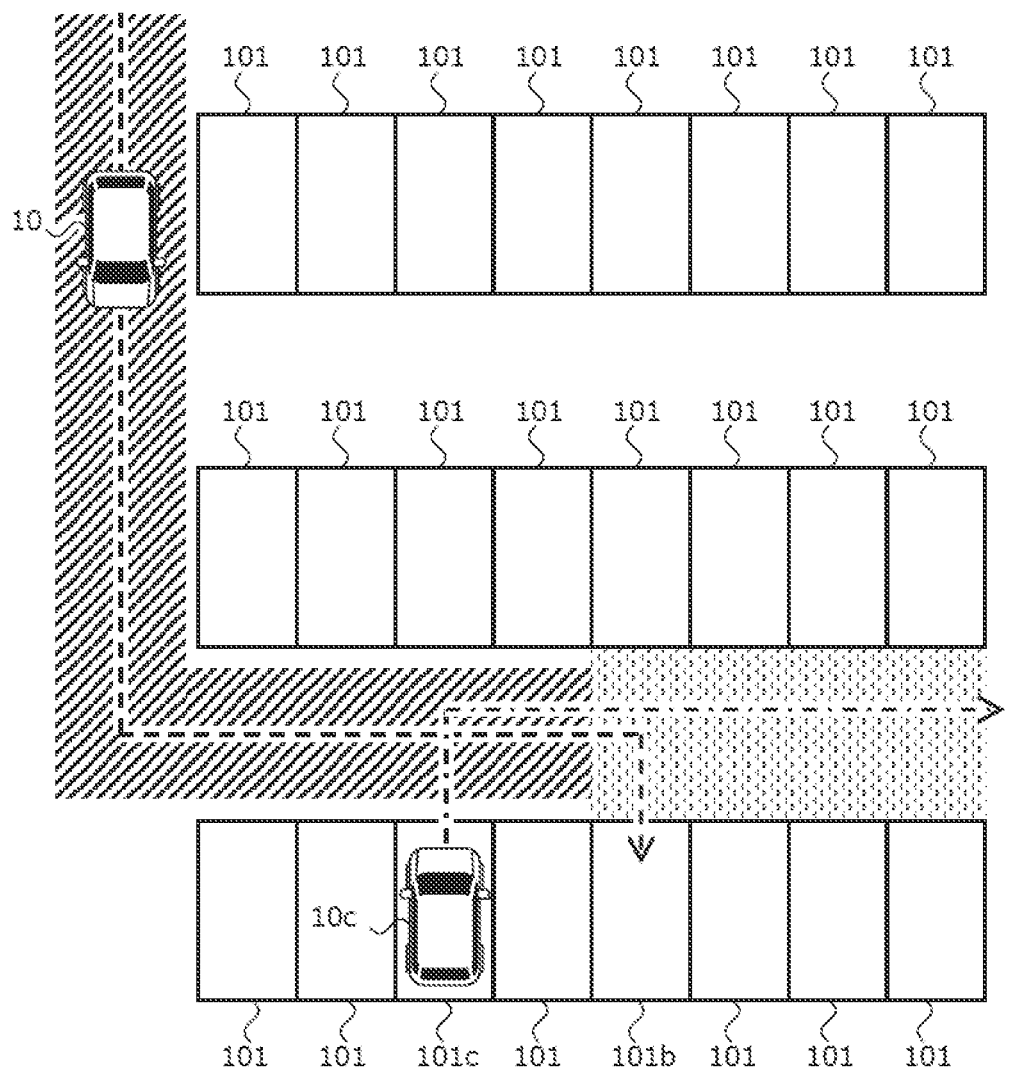
FIG. 2 is a schematic diagram for explaining an exclusive area according to embodiments of the present disclosure.

The exclusive area will be described with reference to FIG. 2. In FIG. 2, a travel route of a vehicle 10 which is assigned a target parking frame 101b when entering the parking place 100 is indicated by a dotted line. An area obtained by combining a shaded area and a dotted area in FIG. 2 is an exclusive area determined for the target parking frame 101b. The travel route and the exclusive area are uniformly determined by the parking support system according to the position of the target parking frame 101b.

In addition, in FIG. 2, a part of a travel route of a vehicle 10c, which is parked in a parking frame 101c, when leaving is indicated by a long dashed and short dashed line. As shown in FIG. 2, the travel route of the vehicle 10c passes the exclusive area. Therefore, until the vehicle 10 finishes parking itself in the target parking frame 101b, the vehicle 10c is prohibited from traveling by the parking support system 20.

As described above, the exclusive area is determined in consideration of an area required for the traveling of the vehicle 10. The shaded area out of the exclusive area indicated in FIG. 2 is determined in consideration of an area which the vehicle 10b requires in order to move forward along the travel route. For example, this shaded area may be determined to be an area of a given width along the travel route to the target parking frame 101b. The given width may be, for example, obtained by adding a margin to the width of the body of the vehicle 10, which uses the parking place 100.

In contrast, the dotted area in FIG. 2 is an area determined in consideration of an area which the vehicle 10 requires when performing a motion to park itself in the target parking frame 101b. For example, this dotted area is determined to include a part of a passage which the target parking frame and three parking frames ahead of the target parking frame in direction of the vehicle 10 is heading in faces. As shown in FIG. 2, this dotted area is not along the travel route. This is because the vehicle 10 performs a motion such as swinging its head or going back and forth around the target parking frame in order to park itself in the target parking frame.

Hereinafter, in the present description, a motion performed by the vehicle 10 to park itself in the target parking frame is referred to as a parking motion, and an area required for the parking motion is referred to as a parking motion area. The parking motion area largely varies depending on a specification of the vehicle 10 or parking environment around the target parking frame unlike an area which the vehicle 10 requires when moving forward along the travel route because the parking motion includes operations such as swing its head or going back and forth.

The specification of the vehicle 10 includes size and turning performance of the vehicle 10. For example, it is expected that if the vehicle 10 has a large size or low turning performance, going back and forth is required many times, thereby the parking motion area becoming large. The parking environment around the target parking frame includes presence or absence of a vehicle parked in a parking frame around the target parking frame and a position of a structure such as a wall or a pillar around the target parking frame. For example, if there is no vehicle parked in a parking frame around the target parking frame, it is expected that the vehicle 10 can park itself in the target parking frame with a little times of going back and forth and the parking motion area becomes small.

The difference in the parking motion area due to the difference in the specification of the vehicle or the parking environment around the target parking frame like this is described with reference to FIG. 3. A vehicle 10d, which is assigned a target parking frame 101d, and a vehicle 10e, which is assigned a target parking frame 101e, are different in size and turning performance. The vehicle 10d is larger in size and lower in turning performance than the vehicle 10e. In addition, parking environment is different from each other. Parking frames on the opposite side to the target parking frame 101d are filled with other vehicles, whereas no vehicles are parked in parking frames on the opposite side of the target parking frame 101e.

Because of the difference like this, the parking motion area of the vehicle 10d and the parking motion area of the vehicle 10e are different from each other. While the vehicle 10d needs an area which the target parking frame 101d and three parking frames ahead of the target parking frame 101d faces for the parking motion, the vehicle 10e needs only an area which the target parking frame 101e and one parking frame ahead of the target parking frame 101d face for the parking motion.

Figure 3:
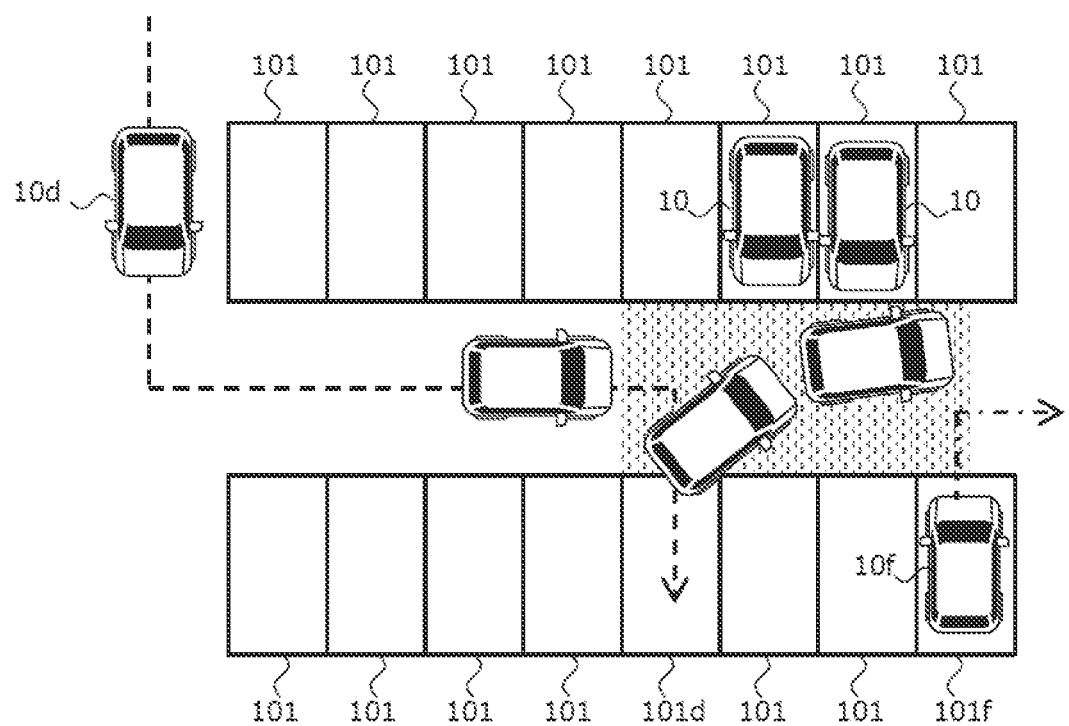
FIG. 3 is a schematic diagram for explaining a parking motion area according to embodiments of the present disclosure.
Figure 3:
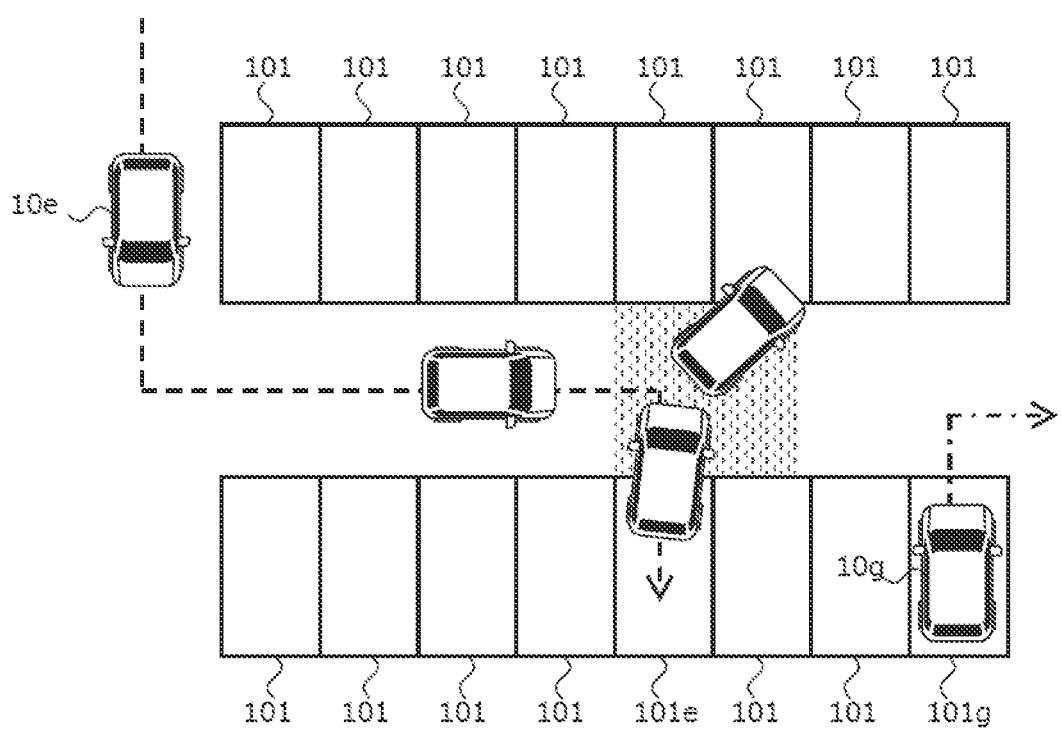

In FIG. 3, a vehicle 10f and a vehicle 10g, which are parked in a parking frame 101f and a parking frame 101g, respectively, are shown. The parking frame 101f and the parking frame 101g are at the same position with respect to the target parking frame 101d and the target parking frame 101e, respectively. Although the vehicle 10f and the vehicle 10g are parked at the same position, the following difference occurs due to the difference between the parking motion area of the vehicle 10d and that of the vehicle 10e. A travel route of the vehicle 10f when leaving passes the parking motion area of the vehicle 10d, whereas a travel route of the vehicle 10g when leaving does not pass the parking motion area of the vehicle 10e.

The exclusive area is generally determined so as to allow a margin in consideration of variation. For example, in FIG. 3, it is assumed that the exclusive area is determined to include an area which three parking frames ahead of the target parking frame face so as to be larger than the parking motion area of the vehicle 10d. However, when the exclusive area is determined like this, if a parking motion area of the vehicle 10 entering the parking place 100 is small as in the case of the vehicle 10e, unnecessary area out of the exclusive area becomes large. In the example of FIG. 3, even though the travel route of the vehicle 10g does not pass the parking motion area of the vehicle 10e, the vehicle 10g is prohibited from traveling until the vehicle 10e finishes parking. Therefore, unnecessary waiting time of the vehicle 10g occurs.

If aiming only to reduce unnecessary part of the exclusive area, the exclusive area can be determined to be small. For example, it is assumed that the exclusive area is determined, based on the parking motion area of the vehicle 10e, to include only an area which one parking frame ahead of the target parking frame faces. However, in this case, on the contrary, inconvenience occurs if the vehicle 10 which needs a large area for the parking motion such as the vehicle 10d enters the parking place 100. In the example of FIG. 3, although the travel route of the vehicle 10f passes the parking motion area of the vehicle 10d, the vehicle 10f is not prohibited from traveling because the travel route of the vehicle 10f does not pass the exclusive area. Therefore, there is a possibility that the vehicle 10f begins traveling before the vehicle 10d finishes parking. It means that safety in the parking place 100 is not guaranteed.

If the parking support system 20 is supposed to be able to set the exclusive area so as to correspond to the parking motion area of the vehicle 10 in advance, above-mentioned problems do not occur. However, in order to determine the parking motion, it is necessary to acquire the situation around the vehicle 10 and the target parking frame by a recognition sensor mounted on the vehicle 10 such as an in-vehicle camera when vehicle 10 begins the parking motion. Further, in order to determine the parking motion, information about the specification of the vehicle 10 possessed by the vehicle 10 has to be taken into consideration in addition to the information like this. Therefore, the parking motion area can be generated by the vehicle 10 only after the vehicle 10 begins the parking motion. Therefore, it is difficult for the parking support system 20 to determine the exclusive area in consideration of the parking motion area in advance.

The parking support method according to the present disclosure is for solving problems caused by these reasons. According to the parking support method of the present disclosure, after the parking motion area is generated by the vehicle 10, the exclusive area is changed based on the information about the generated parking motion area so that the exclusive area becomes an appropriate area corresponding to the situation of parking of each vehicle 10. As a result, it is possible to reduce unnecessary waiting time while retaining safety in the parking place 100 and realize efficient parking.

The parking support method of the present disclosure includes three steps. The first step is a step of setting the exclusive area. The exclusive area set in the first step is uniformly determined according to the position of the target parking frame. This uniformly determined exclusive area may be referred to as a "basic exclusive area" in this description.

The second step is a step of acquiring the parking motion area generated by the vehicle 10 when the vehicle 10 begins the parking motion. The vehicle 10 calculates information for determining the parking motion based on the information about the specifications of the vehicle 10 and the parking environment around the target parking frame when reaching the position at which the vehicle 10 begins the parking motion. The vehicle 10 can generate the parking motion area based on the calculated information. The parking motion area acquired in the second step is generated in this way.

The third step is a step of changing the exclusive area so as to secure at least the acquired parking motion area. In the third step, the exclusive area is changed into an area of appropriate size. Therefore, it is possible to prevent another vehicle from beginning traveling and passing the parking motion area before the vehicle 10 finishes parking and to reduce wasteful waiting time of another vehicle which does not pass the parking motion area.

2. First Embodiment

The first embodiment of the parking support method of the present disclosure will be described. According to the first embodiment, the basic exclusive area is set allowing for a margin in consideration of variation. According to the first embodiment, the basic exclusive area includes an area uniformly determined to be larger than the parking motion area of the vehicle 10.

Figure 4:
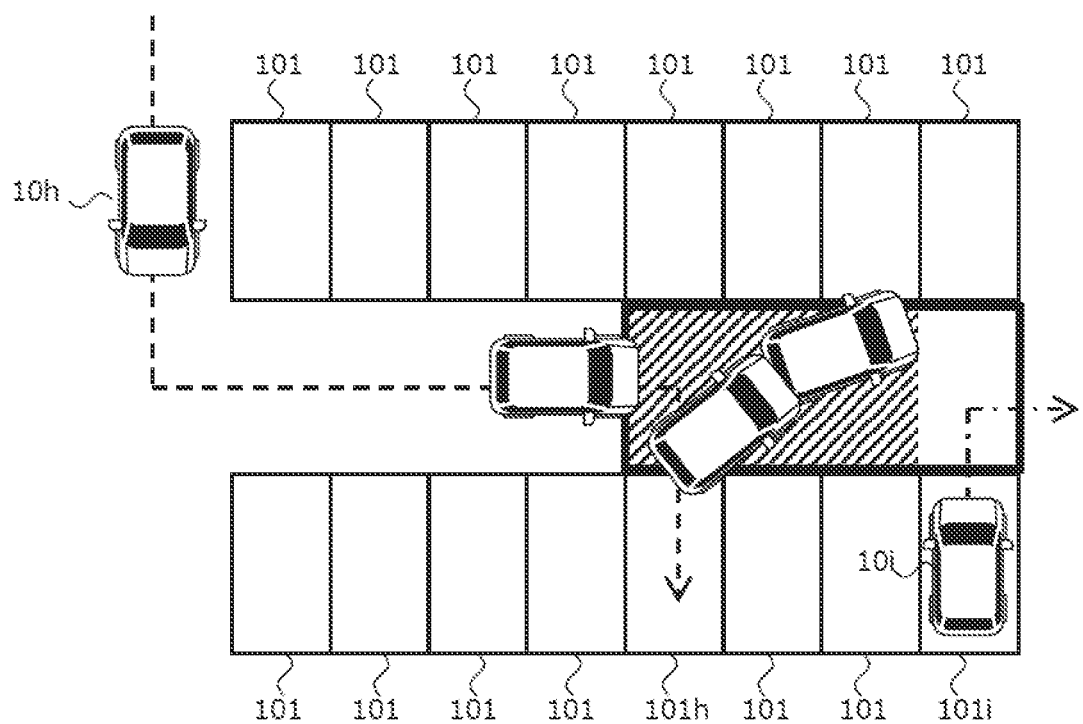
FIG. 4 is a schematic diagram for explaining the first embodiment of the present disclosure.

FIG. 4 is a schematic diagram for explaining the first embodiment. In the example shown in FIG. 4, a target parking frame 101h is assigned to a vehicle 10h entering the parking place 100. An area surrounded by a thick frame is the uniformly determined area which is included in the basic exclusive area in the first embodiment. This area is determined to be larger than a parking motion area required by any vehicle 10. For example, this area may be determined to include a parking motion area required by a vehicle having the largest body and the lowest turning performance among the vehicles 10 using the parking place 100 for the parking motion when parking frames around the target parking frame are filled.

A shaded area in FIG. 4 is the parking motion area generated when the vehicle 10h begins the parking motion to park itself in the target parking frame 101h. The shaded area is smaller than the area of the thick frame, which is included in the exclusive area, because the area of the thick frame is determined to be larger than a parking motion area required by any vehicle 10. It means that according to the first embodiment, the basic exclusive area is reduced to suit the parking motion area in the third step of the parking support method.

Effects of the first embodiment will be described using leaving of a vehicle 10i parked in a parking frame 101i as an example. A long dashed and short dashed line arrow indicates a part of the travel route when the vehicle 10i leaves. Because the travel route of the vehicle 10i passes the area of the thick frame, which is a part of the exclusive area, the vehicle 10i is prohibited from traveling until the vehicle 10h finishes parking. By prohibiting all vehicles which have a possibility of passing the parking motion area are prohibited from traveling until the parking motion area is generated, safety in the parking place 100 can be enhanced.

Furthermore, according to the first embodiment, the basic exclusive area is reduced to suit the parking motion area in the third step. Therefore, when the parking motion area is generated and it becomes clear that the vehicle 10i does not pass the parking motion area, the vehicle 10i is permitted to leave without waiting for the vehicle 10h to finish parking. Like this, by reducing the basic exclusive area, it is possible to reduce a wasteful waiting time of another vehicle to be permitted to travel and to realize efficient parking.

3. Second Embodiment

The second embodiment of the parking support method according to the present disclosure will be described. According to the second embodiment, the basic exclusive area is set uniformly according to the position of the target parking frame without considering the parking motion in the first step.

Figure 5:
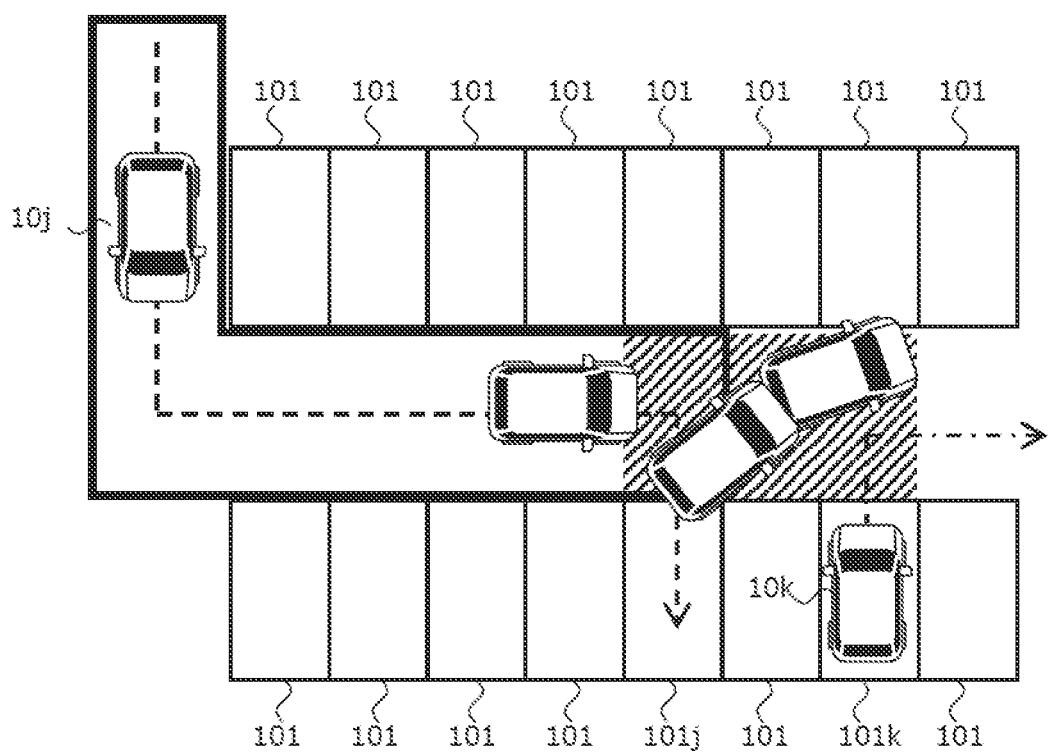
FIG. 5 is a schematic diagram for explaining the second embodiment of the present disclosure.

FIG. 5 is a schematic diagram for explaining the second embodiment. In FIG. 5, a travel route of a vehicle 10j which is assigned the target parking frame 101j is indicated by a dotted line. An area surrounded by a thick frame indicates an example of the basic exclusive area, which is uniformly determined, according to the second embodiment. The basic exclusive area according to the second embodiment is set without considering the parking motion area. For example, this area may be set to include only a part along the travel route of the vehicle 10j out of the passage of the parking place 100.

A shaded area in FIG. 5 is the parking motion area generated when the vehicle 10j begins the parking motion to park itself in the target parking frame 101j. The shaded area is an area expanding the area of the thick frame, which is the basic exclusive area, toward a direction in which the vehicle 10j is heading because the area of the thick frame is determined without considering the parking motion area. It means that according to the second embodiment, the basic exclusive area is expanded to suit the parking motion area in the third step of the parking support method.

Effects of the second embodiment will be described using leaving of a vehicle 10k parked in a parking frame 101k as an example. A long dashed and short dashed line arrow indicates a part of the travel route when the vehicle 10k leaves. The vehicle 10k can leave until the parking motion area of the vehicle 10j is generated because the travel route of the vehicle 10k is not included in the area of the thick frame. Since a vehicle whose travel route is not clear to be included in the parking motion area is not prohibited from traveling, unnecessary waiting time does not occur, and efficient traveling in the parking place 100 can be realized.

Further, in the third step, the basic exclusive area is expanded to suit the parking motion area. Therefore, after the parking motion area is generated, the vehicle 10k, which becomes clear to pass the parking motion area, is prohibited from traveling. By expanding the basic exclusive area in this way, safety in the parking place 100 can be enhanced also in the second embodiment.

4. Generation of Parking Motion Area

Information necessary for the vehicle 10 to calculate the parking motion includes the information about the specification of the vehicle 10 and the parking environment around the target parking frame. The specification of the vehicle 10 includes the size and turning performance of the vehicle 10. The vehicle 10 can acquire the information about its own specifications in advance. The information about the parking environment around the target parking frame includes information about a parking situation in parking frames around the target parking frame and a distance between the vehicle 10 and the structure around the target parking frame. The vehicle 10 can acquire the information about the parking environment around the target parking frame by, for example, the recognition sensor such as the camera mounted on the vehicle 10. When getting close to the target parking frame and beginning the parking motion, the vehicle 10 calculates the information for the parking motion based on the information like this. Then, the vehicle 10 can generate the parking motion area based on the calculated information.

5. Updating of Exclusive Area

The information about the parking motion of the vehicle 10 can be corrected and updated in accordance with the actual position of the vehicle 10 at any time even after the parking motion is begun. When the parking motion is changed, the parking motion area is also changed, so the vehicle 10 may regenerate the parking motion area at any time until finishing parking. In the parking support method according to the present disclosure, the parking support system 20 acquires the parking motion area at least when the vehicle 10 begins the parking motion. However, the parking support system 20 may acquire the parking motion area at other time. The parking support system 20 may acquire the parking motion area at any time in accordance with progress of parking of the vehicle 10 until the vehicle 10 finishes parking. In this case, when the regenerated parking motion area is acquired, the parking support system 20 updates the exclusive area based on the regenerated parking motion area. By updating the exclusive area at any time and making it more accurate reflecting the current situation, more efficient parking can be realized.

6. Other Embodiments

The parking support method of the present disclosure can be applied to different parking style. For example, both in a case where the vehicle 10 is parked in the target parking frame by reverse parking and in a case of forward parking, the parking support method can be applied. In both cases, the vehicle 10 needs to perform a motion such as swinging its head or going back and forth when parking. Therefore, affected by the specifications of the vehicle 10, the parking environment around the target parking frame, and the like, the parking motion area changes for each vehicle 10 or for each parking environment at the time of parking. Therefore, by the parking support method of the present disclosure, the parking support system 20 can support parking more efficiently regardless of the parking style.

7. Conclusion

As described above, according to the parking support method of the present disclosure, it is possible to enhance safety in the parking place 100 and to reduce unnecessary waiting time of another vehicle when the vehicle 10 enters parking place 100. As a result, efficient parking can be realized in the parking place 100.

What is claimed is:

1. A parking support method for supporting parking of a vehicle in a parking place, the vehicle capable of autonomous driving at least in the parking place via a vehicle control system, the parking support method comprising steps of:
    setting an exclusive area in which other vehicles are prohibited from traveling in order to secure an area in which the vehicle entering the parking place travels, the exclusive area being determined uniformly according to a position of a parking frame, the setting of the exclusive area includes a setting of a basic exclusive area including an area uniformly determined to be larger than a parking motion area;
    at least when the vehicle begins a parking motion to park the vehicle in the parking frame, acquiring the parking motion area required for the parking motion and generated by the vehicle, the parking motion area being an area required for the parking motion; changing the exclusive area so as to secure at least the parking motion area, the changing the exclusive area includes reducing the basic exclusive area to suit the parking motion area, and expanding the basic exclusive area toward a direction that the vehicle is heading in to suit the parking motion area;
    generating a travel route of the vehicle based on the position of the target parking frame, the generated travel route is a route to the parking motion area;
    transmitting the generated travel route to vehicle control system of the vehicle, and,
    in response to the transmitted generated travel route, the vehicle automatically travels along the travel route and automatically parks itself in the target parking frame by control of the vehicle control system.

2. The parking support method according to claim 1, wherein the parking motion area is generated based on information about parking environment around the parking frame and information about a specification of the vehicle.

3. The parking support method according to claim 1, wherein:
    the parking motion area can be regenerated at any time until the parking motion of the vehicle is completed in accordance with progress of the parking of the vehicle; and
    the parking support method further comprises a step of when a regenerated parking motion area is acquired, updating the exclusive area based on the regenerated parking motion area.

4. A non-transitory computer-readable storage medium storing a program for supporting parking of a vehicle in a parking place, the vehicle capable of autonomous driving at least in the parking place via a vehicle control system, the program configured to cause a computer to execute:
    setting an exclusive area in which other vehicles are prohibited from traveling in order to secure an area in which the vehicle entering the parking place travels, the exclusive area being determined uniformly according to a position of a parking frame, the setting of the exclusive area includes a setting of a basic exclusive area including an area uniformly determined to be larger than a parking motion area;
    at least when the vehicle begins a parking motion to park the vehicle in the parking frame, acquiring the parking motion area required for the parking motion and generated by the vehicle, the parking motion area being an area required for the parking motion;
    changing the exclusive area so as to secure at least the parking motion area, the changing the exclusive area includes reducing the basic exclusive area to suit the parking motion area, and expanding the basic exclusive area toward a direction that the vehicle is heading in to suit the parking motion area;
    generating a travel route of the vehicle based on the position of the target parking frame, the generated travel route is a route to the parking motion area;
    transmitting the generated travel route to vehicle control system of the vehicle, and, in response to the transmitted generated travel route, the vehicle automatically travels along the travel route and automatically parks itself in the target parking frame by control of the vehicle control system.

5. A parking support system for supporting parking of a vehicle in a parking place, the vehicle capable of autonomous driving at least in the parking place via a vehicle control system, the parking support system comprising:

one or more computers; and one or more memory devices storing one or more programs that when executed by the one or more computers, cause the one or more computers to execute:

setting an exclusive area in which other vehicles are prohibited from traveling in order to secure an area in which the vehicle entering the parking place travels, the exclusive area being determined uniformly according to a position of a parking frame, the setting of the exclusive area includes a setting of a basic exclusive area including an area uniformly determined to be larger than a parking motion area;

at least when the vehicle begins a parking motion to park the vehicle in the parking frame, acquiring the parking motion area required for the parking motion and generated by the vehicle, the parking motion area being an area required for the parking motion;

changing the exclusive area so as to secure at least the parking motion area, the changing the exclusive area includes reducing the basic exclusive area to suit the parking motion area, and expanding the basic exclusive area toward a direction that the vehicle is heading in to suit the parking motion area;

generating a travel route of the vehicle based on the position of the target parking frame, the generated travel route is a route to the parking motion area;

transmitting the generated travel route to vehicle control system of the vehicle, and, in response to the transmitted generated travel route, the vehicle automatically travels along the travel route and automatically parks itself in the target parking frame by control of the vehicle control system.

\* \* \* \* \*